March 26, 1940.   N. O. BERGQUIST   2,194,995
DEVICE FOR DETERMINING THE INCLINATION OF AN AXLE TO TWO DIFFERENT PLANES
Filed Feb. 23, 1938
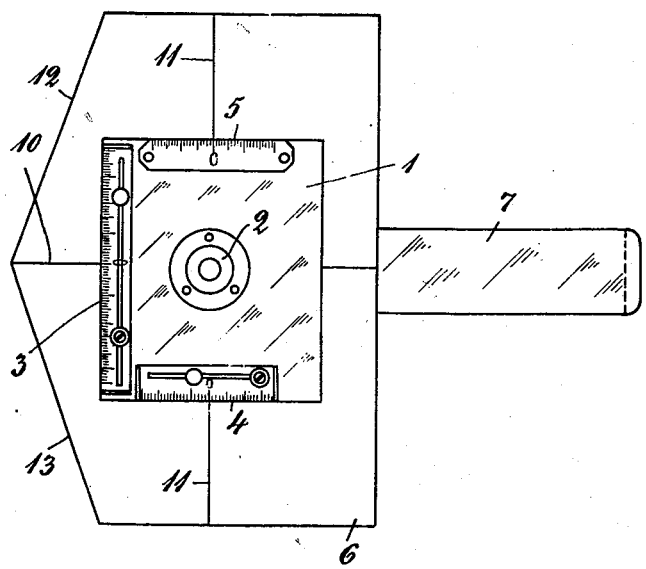
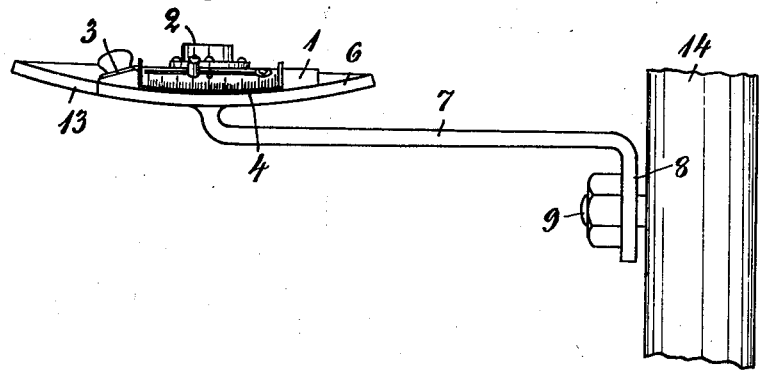

Patented Mar. 26, 1940

2,194,995

UNITED STATES PATENT OFFICE 2,194,995

DEVICE FOR DETERMINING THE INCLINATION OF AN AXLE TO TWO DIFFERENT PLANES

Nils Olof Bergquist, Stockholm, Sweden

Application February 23, 1938, Serial No. 192,175
In Sweden February 11, 1937

8 Claims. (Cl. 33—203)

The present invention relates to angle measuring devices, and has for its object to provide an angle measuring device which is simple of construction as well as small and handy and yet very accurate. It is a particular object of the invention to provide an angle measuring device of the above character which is adapted to be used for determining directly the inclination of an axle with respect to two datum planes, for instance the caster angle and king pin inclination in connection with the adjustment of the steering wheels of an automobile.

Other objects of the invention will be apparent from the following detailed description of a preferred embodiment with reference to the annexed drawing in which:

Figure 1 shows the device as viewed from above and Figure 2 the same as viewed from the side.

According to the embodiment illustrated, the instrument consists of a plate 1 the bottom side of which has a spherical convex surface. A round spirit level 2 is fixed on the upper side of the plate 1, this side also having two longitudinally displaceable, manually operable scales 3 and 4 arranged thereon. On the upper side of the plate 1 there is also a fixed scale 5.

The plate 1 is adapted to rest on a holder 6 the upper side of which is spherically concave in agreement with the spherical convex lower side of the plate 1. The holder 6 is supported by an arm 7, which is adapted to be secured with its angularly bent outer end 8 on the wheel axle 9, said end 8 of the arm 7 having means for securing it on axles of any current diameter. On the upper side of the holder 6 there are two indicating lines 10 and 11 which extend across the holder at right angles to each other. As will be seen from Figure 1, the outwardly directed edge of the holder 6 is angularly shaped so as to form two sighting edges 12 and 13 in angular relationship.

The measurement is performed in the following manner.

For the first adjustment of the instrument 1 the wheels 14 should primarily take their position for driving straight forwards. The instrument is displaced on the holder 6 until the spirit level 2 indicates that the instrument takes up a horizontal position. At this adjustment as well as at the adjustments described in the following, the scale 3 must always be parallel to the line 11. By means of the indication line 11 the wheel inclination (the camber) is read off the scale 5 directly. After that, the wheel 14 and thus the holder 6 are turned so that one of the oblique edges, for instance the edge 12, is paralleling the longitudinal direction of the vehicle, and in order to facilitate sighting, a rule or the like may be held against the said edge. After that, the instrument is adjusted by being displaced on the holder 6, so that the spirit level 2 indicates a horizontal position, whereupon the scales 3 and 4 are displaced until "0" on each scale is just in register with the indicating line 10 or 11. After that, the wheel 14 is turned so that the other oblique edge, for instance the edge 13, becomes parallel to the longitudinal direction of the vehicle, the instrument being again adjusted, so that the spirit level shows a horizontal position, whereupon the rearward inclination of the pivot pin (the caster angle) is read off the scale 4 with the aid of the line 11, and the inclination of the wheel axle i. e. the inward inclination of the pivot pin (the axle camber) is read off the scale 3 with the aid of the line 10.

The graduation of the scales 3 and 4 is calculated after the angle of the oblique edges 12 and 13 respectively to the longitudinal axis of the vehicle. By giving the spherical surface of the holder 6 a greater or smaller radius, a greater or smaller sensitivity or accuracy of reading may be obtained.

In certain cars provided with so-called knee joints, it is necessary to control that the level of the spring is not altered at the turning of the wheel. In order to avoid this, the arm 7 of the holder 6 may be arranged to be secured to the knee joint housing instead of on the wheel axle.

Instead of having the instrument resting on a spherical surface to render possible its adjustment in various positions of inclination, it may be secured by means of links, screws or the like to the holder in a manner such that it may be adjusted to any desired inclination and horizontally. Furthermore, the position of the instrument relatively to the horizontal plane may possibly be controlled by means of a pendulum or the like instead of by means of a spirit level, although this latter method is believed to be the simplest one. In place of a round spirit level, it is of course possible to use two or more tubular spirit levels.

I claim:

1. An angle measuring device comprising in combination, a first member, a second member slidable with respect to said first member in at least two directions along a spherical surface of engagement, means for determining a certain angular position of said second member with respect to a fixed plane, and mutually cooperating indicating means on said first member and on said second member for determining the angular position of said first member with respect to said second member.

2. An angle measuring device comprising in combination, a first member having an upper concave spherical surface, a second member having a complementary lower convex spherical surface, said second member being slidably supported on said first member with its convex surface in engagement with the concave surface of the latter, means on said second member for indicating adjustment thereof to a certain angular position with respect to a horizontal plane, and cooperating indicating means on said first member and on said second member for determining the angular relation between said first member and said second member.

3. An angle measuring device comprising in combination, a first member having an upper concave spherical supporting surface, a second member slidably supported on said first member by means of a complementary lower convex spherical surface provided thereon, means on said second member for indicating adjustment thereof to a certain angular position with respect to a horizontal plane, and scales provided on said second member adapted to cooperate with mutually crossing fixed index lines provided on said first member to determine the angular relation between said first and said second members.

4. An angle measuring device as claimed in claim 3, in which the index lines and the scales respectively cross each other at right angles.

5. An angle measuring device as claimed in claim 3, in which the scales are adjustable in their longitudinal direction with respect to the second member.

6. A device for determining the inclination of an axle relatively to two different datum planes comprising in combination, a first member, a second member supported by said first member so as to be slidable with respect thereto along a spherical surface of engagement, means on said second member for indicating a certain angular position of the latter with respect to a horizontal plane, means for determining two angular positions of said first member, and mutually cooperating indicating means on said first member and on said second member for determining the angular relation between said first member and said second member, said indicating means being so graduated as to indicate the mutual angular displacement of said first and said second members upon turning of said first member from one of its angular positions to the other directly in terms of the inclination of said axle to said two datum planes.

7. A device as claimed in claim 6, in which the means for determining the angular position of said member consist of two sighting edges in angular relationship.

8. A device as claimed in claim 6, in which the indicating means consist of fixed index lines provided in the first member and of scales provided on the second member, said scales being adjustable to zero positions with respect to the corresponding index lines after turning of said first member to one of its definite angular positions in order to render possible direct reading of the inclination of the axle after turning of said first member to the other one of its definite angular positions.

NILS OLOF BERGQUIST.